(12) United States Patent
Wang et al.

(10) Patent No.: US 11,043,708 B2
(45) Date of Patent: Jun. 22, 2021

(54) BATTERY PACK AND SPRAY SYSTEM FOR SAME

(71) Applicant: CONTEMPORARY AMPEREX TECHNOLOGY CO., LIMITED, Ningde (CN)

(72) Inventors: Wenli Wang, Ningde (CN); Xiaoteng Huang, Ningde (CN); Kaiyuan Mao, Ningde (CN); Jiarong Hong, Ningde (CN)

(73) Assignee: Contemporary Amperex Technology Co., Ltd., Ningde (CN)

( * ) Notice: Subject to any disclaimer, the term of this patent is extended or adjusted under 35 U.S.C. 154(b) by 116 days.

(21) Appl. No.: 16/504,272

(22) Filed: Jul. 7, 2019

(65) Prior Publication Data

US 2020/0212524 A1   Jul. 2, 2020

(30) Foreign Application Priority Data

Dec. 28, 2018 (CN) .......................... 201811624585.9

(51) Int. Cl.
   *H01M 10/6567* (2014.01)
   *H01M 10/613* (2014.01)
   (Continued)

(52) U.S. Cl.
   CPC ..... *H01M 10/6567* (2015.04); *H01M 10/613* (2015.04); *H01M 10/6556* (2015.04); *H01M 50/20* (2021.01)

(58) Field of Classification Search
   CPC ........... H01M 10/6567; H01M 10/613; H01M 10/6556; H01M 2/1077
   (Continued)

(56) References Cited

U.S. PATENT DOCUMENTS 6,340,058 B1 * 1/2002 Dominick ............ A62C 35/026
                                                               169/26
8,329,325 B2 * 12/2012 Brodie ................ H01M 10/613
                                                               429/62
(Continued)

FOREIGN PATENT DOCUMENTS

CN   292185099        4/2012
CN   102451532 A      5/2012
            (Continued)

OTHER PUBLICATIONS

First Office Action in related Chinese case No. 201811624585.9.
(Continued)

*Primary Examiner* — Tae-Sik Kang
(74) *Attorney, Agent, or Firm* — Panagos Kennedy PLLC; Bill Panagos; Linda Kennedy

(57) ABSTRACT

The present disclosure provides a spray system for a battery pack and a battery pack. The spray system includes a spray pipeline configured to circulate a spray liquid and form an opening when being heating, a liquid storage device communicating with the spray pipeline, and a driving device including a driving component and an elastic component connected to the driving component. The driving component, under an elastic force applied by the elastic component, drives the spray liquid in the liquid storage device to flow into the spray pipeline. In the present spray system, the spray liquid not only in the spray pipeline but in the liquid storage device can be discharged to spray, thereby improving the spray effect, preventing the heat flow generated when the one battery unit is thermally out of control from spreading to the adjacent battery units, and improving the safety of the battery pack.

13 Claims, 4 Drawing Sheets

(51) Int. Cl.
    *H01M 10/6556*   (2014.01)
    *H01M 50/20*   (2021.01)
(58) Field of Classification Search
    USPC .......................................... 429/120
    See application file for complete search history.

(56) References Cited

U.S. PATENT DOCUMENTS

| | | | | |
|---|---|---|---|---|
| 2012/0175137 | A1* | 7/2012 | Hedrick | C07C 17/25 |
| | | | | 169/5 |
| 2015/0086829 | A1* | 3/2015 | Sun | H01M 10/653 |
| | | | | 429/120 |
| 2017/0352931 | A1* | 12/2017 | Yoshida | H01M 10/627 |

FOREIGN PATENT DOCUMENTS

| | | |
|---|---|---|
| CN | 103208602 A | 7/2013 |
| CN | 105810859 A | 7/2016 |
| CN | 206822989 U | 1/2018 |
| CN | 207785704 U | 8/2018 |
| CN | 108744344 | 11/2018 |
| EP | 2755275 A2 | 7/2014 |
| KR | 20120056386 A | 6/2012 |
| KR | 20180124439 A | 11/2018 |

OTHER PUBLICATIONS

European Search Report in related EP case EP19184160.
Related Case (Application No. or Publication No. 201811624585.9) in China—Third Office Action.

* cited by examiner

BATTERY PACK AND SPRAY SYSTEM FOR SAME

CROSS-REFERENCE TO RELATED APPLICATIONS

The present application claims priority to Chinese Patent Application No. 201811624585.9, filed on Dec. 28, 2018, the content of which is incorporated herein by reference in its entirety.

TECHNICAL FIELD

The present disclosure relates to the technical field of energy storage devices, and more particularly, to a spray system for a battery pack and a battery pack.

BACKGROUND

At present, electric vehicle accidents frequently occur, which are mainly caused by spontaneous combustion of batteries. A battery includes a box body and a battery unit located inside the box body. As the energy density of the battery is gradually increased, the chemical system of the battery unit tends to have a higher energy density, and thus have a much larger volume. However, when the thermal failure occurs, the battery unit with a high energy density releases high-temperature heat flow. The high-temperature heat flow is prone to combustion when it comes into contact with air, and can further spread to adjacent battery units, thereby causing the whole battery pack to burn and thus putting the passengers and driver in danger.

SUMMARY

In view of above, the present disclosure provides a spray system for a battery pack and a battery pack, in order to solve problems of the burning of adjacent battery units and the personal safety of the passenger caused by the heat flow spreading during thermal failure.

In a first aspect of the present disclosure, a spray system for a battery pack is provided. The spray system includes a spray pipeline configured to circulate a spray liquid and forming an opening when being heated, a liquid storage device communicating with the spray pipeline; and a driving device including a driving component and an elastic component connected to the driving component. The driving component, under an elastic force applied by the elastic component, drives the spray liquid in the liquid storage device to flow into the spray pipeline.

Preferably, the driving device includes two liquid outlets, and the two liquid outlets communicate with two ends of the spray pipeline, respectively.

Preferably, the two liquid outlets are located at two ends of the liquid storage device along an axial direction thereof, the driving device is disposed in an inner cavity of the liquid storage device, and the driving component includes two driving plates disposed along the axial direction, the two driving plates being respectively connected to two ends of the elastic component and each movable towards a respective one of the two liquid outlets.

Preferably, the driving device further includes a limiting component having a first working state and a second working state. In the first working state, the limiting component acts on the two driving plates to limit a distance between the two driving plates in such a manner that the elastic component is brought to a compressed state. In the second working state, the limiting component does not act on the two driving plates, and the distance between the two driving plates increases under the elastic force applied by the elastic component.

Preferably, the elastic component is one or more of a hydraulic spring, a constant force spring, or an elastic foam.

Preferably, two ends of the limiting component are respectively connected to the two driving plates, and the limiting component is provided with several breaking points, at each of which the limiting component is breakable; or the limiting component includes a glue material, through which a peripheral wall of each of the two driving plates and an inner wall of the liquid storage device are adhered together.

Preferably, a sliding seal structure is provided between a peripheral wall of each of the two driving plates and an inner wall of the liquid storage device.

Preferably, each of the two driving plates has a same distance from its respective one of the liquid outlets when the limiting component is in the first working state.

Preferably, the liquid storage device includes a first end and a second end oppositely disposed to the first end, where the second end is closed, and the first end is provided with a liquid outlet communicating with the spray pipeline; and the driving device is disposed in an inner cavity of the liquid storage device and includes a driving plate that is movable towards the liquid outlet, and two ends of the elastic component are connected to the driving plate and the second end, respectively.

Preferably, driving device further includes a limiting component having a first working state and a second working state. In the first working state, the limiting component acts on the driving plate to limit a distance between the driving plate and the second end in such a manner that the elastic component is brought to a compressed state. In the second working state, the limiting component does not act on the driving plate, and the distance between the driving plate and the second end increases under the elastic force applied by the elastic component.

Preferably, the spray liquid in the liquid storage device and the spray pipeline is a fluorinated liquid.

In a second aspect of the present disclosure, a battery pack is provided. The battery pack includes a case having an inner cavity, a battery unit disposed in the inner cavity of the case and including a vent, and a spray system according to the first aspect. The spray pipeline of the spray system is provided in association with the vent.

In the present application, when a battery unit is thermally out of control and heat flow is discharged from its vent, under the effect of the heat flow, a spray pipeline can form an opening at a position corresponding to the vent under heating, such that spray liquid in the spray pipeline can be discharged through the opening, preventing the heat flow from spreading. In the meantime, after the spray liquid in the spray pipeline is discharged through the opening, the driving device can drive the spray liquid stored in the liquid storage device to flow into the spray pipeline and to be discharged through the opening of the spray pipeline, further preventing the heat flow from spreading.

Therefore, in the present spray system provided with the liquid storage device and the driving device, not only the spray liquid in the spray pipeline but also the spray liquid in the liquid storage device can be discharged to achieve spray. In this way, the spray effect is improved, and heat flow generated when one battery unit is thermally out of control is prevented from spreading to adjacent battery units, thereby improving the safety of the battery pack.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

DESCRIPTION OF EMBODIMENTS

Figure 1:
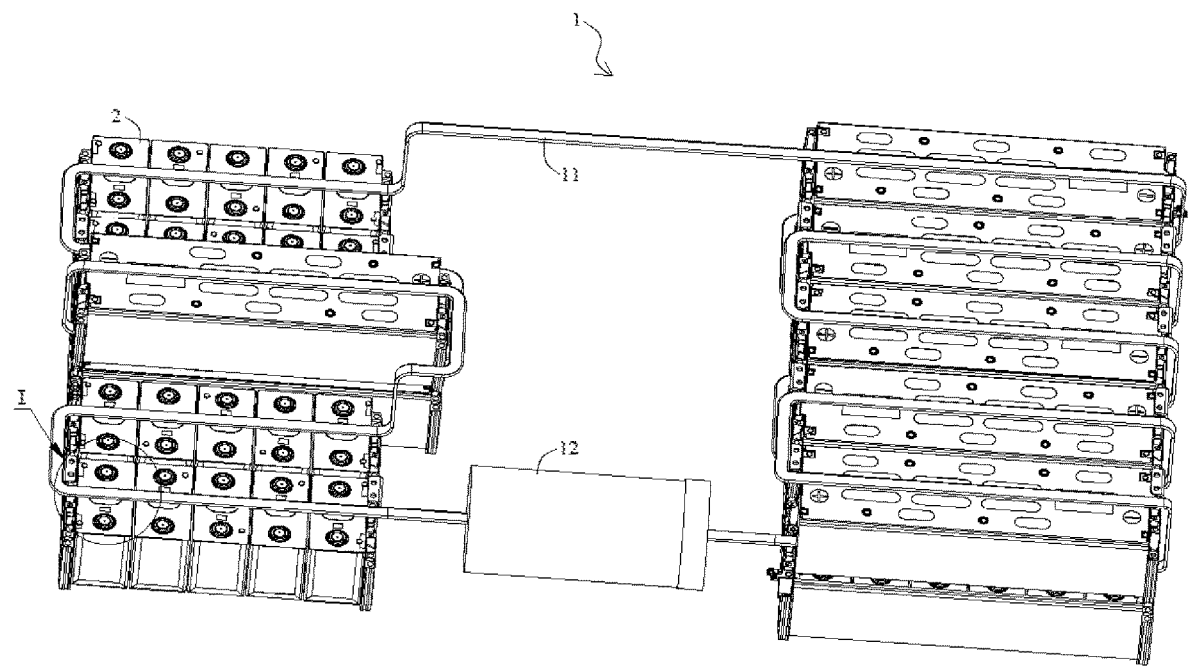
FIG. 1 is a structural schematic diagram of a battery pack according to an embodiment of the present disclosure.

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiments, rather than limiting the present disclosure. The singular form "a", "an", "the" and "said" used in the embodiments and claims shall be interpreted as also including the plural form, unless indicated otherwise in the context.

It should be understood that, the term "and/or" is used in the present disclosure merely to describe relations between associated objects, and thus includes three types of relations. That is, A and/or B can represents: (a) A exists alone; (b) A and B exist at the same time; or (c) B exists alone. In addition, the character "/" generally indicates "or".

It should be understood that, the term such as "upper", "lower", "left", "right" and the like are used to indicate positions shown in the drawing, instead of being construed as limitations of the embodiment of the present disclosure. In addition, when an element is described as being "on" or "under" another element in the context, it should be understood that the element can be directly or via an intermediate element located "on" or "under" another element.

When battery units in the battery pack are thermally out of control, the battery pack is likely to be burned, which may put the vehicle and the passengers in danger. In the present disclosure, the safety of the battery pack is improved mainly by providing the battery pack with an additional spray system.

Figure 2:
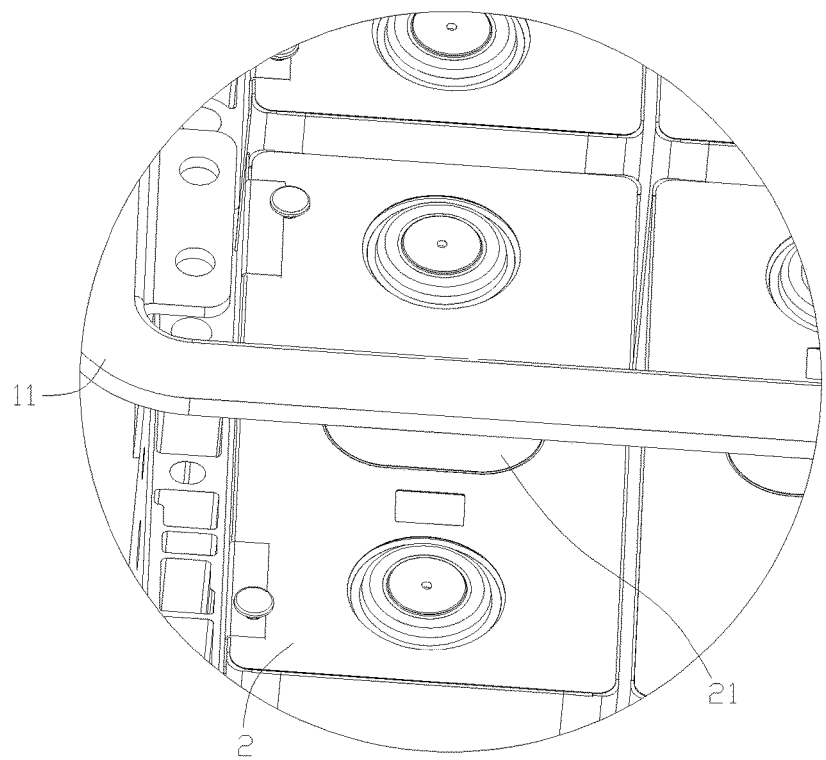
FIG. 2 is a partially enlarged view of Portion I of FIG. 1.
Figure 3:
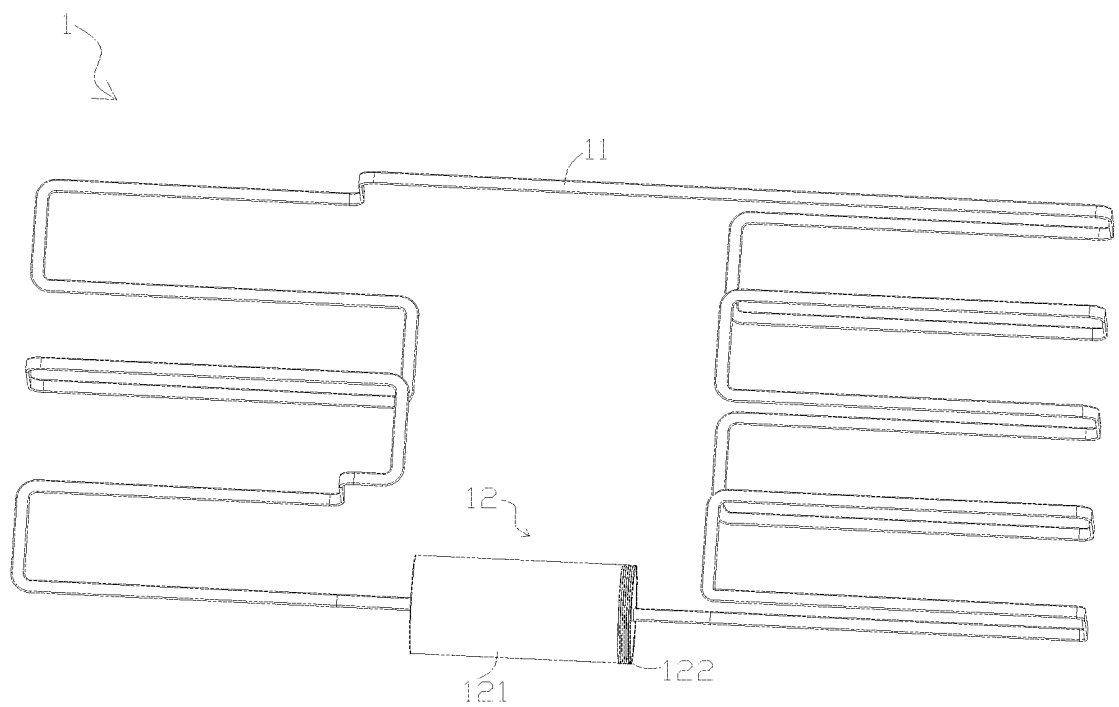
FIG. 3 is a structural schematic diagram of a spray system in FIG. 1.
Figure 4:
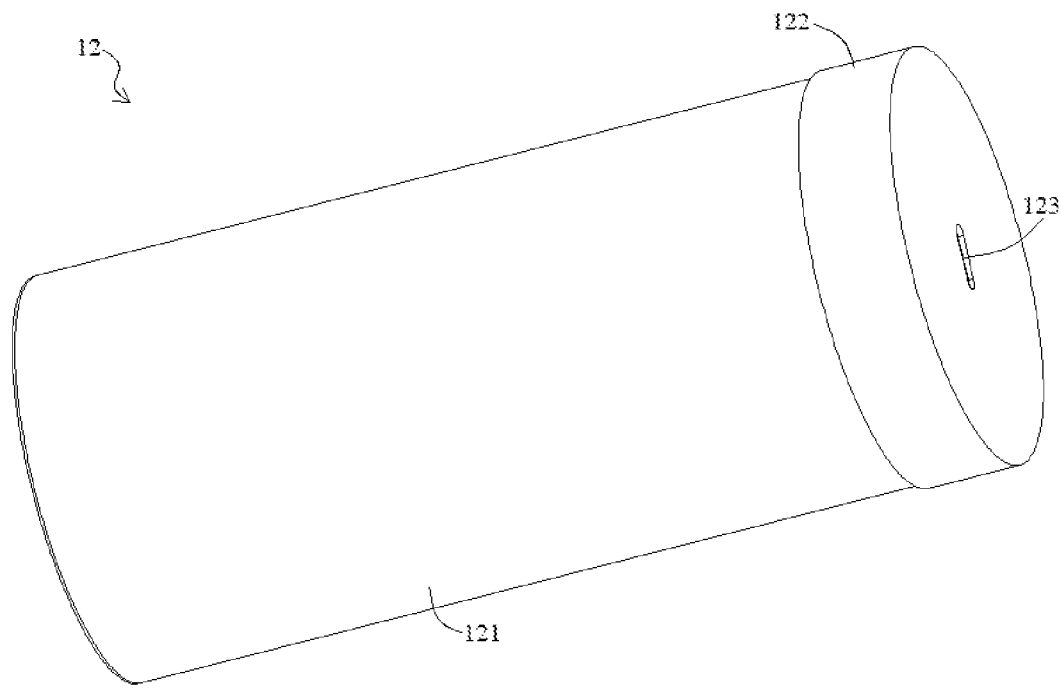
FIG. 4 is a structural schematic diagram of a liquid storage device in FIG. 3.
Figure 5:
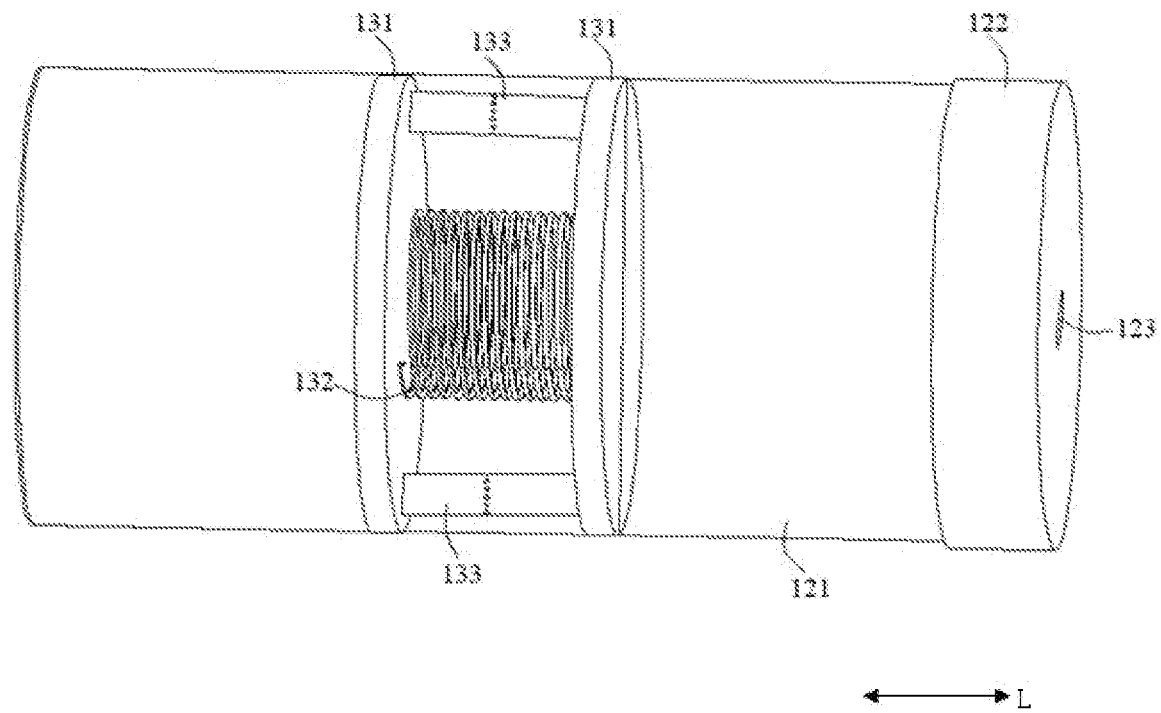
FIG. 5 is a perspective view of FIG. 4.
Figure 6:
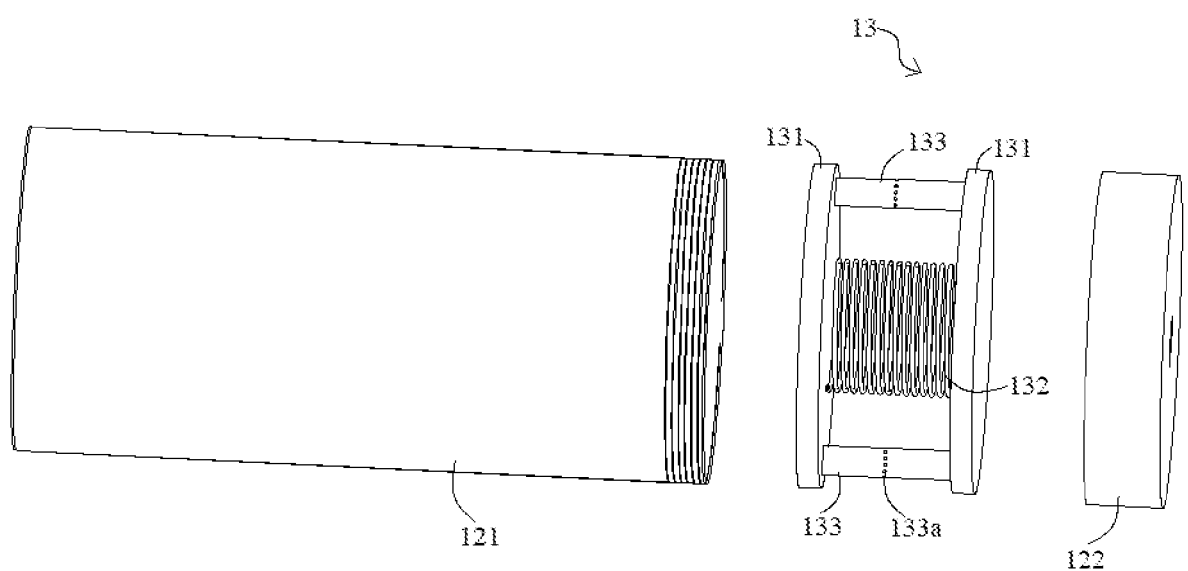
FIG. 6 is an exploded view of FIG. 4.
Figure 7:
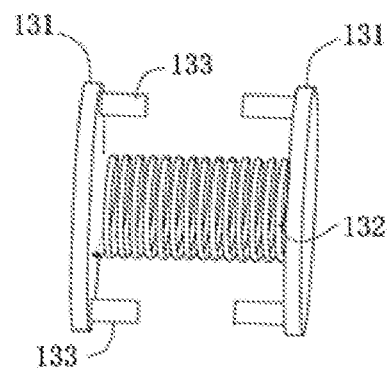
FIG. 7 is a structural schematic diagram of a driving device in FIG. 6 when a limiting component is in a second working state.
Figure 8:
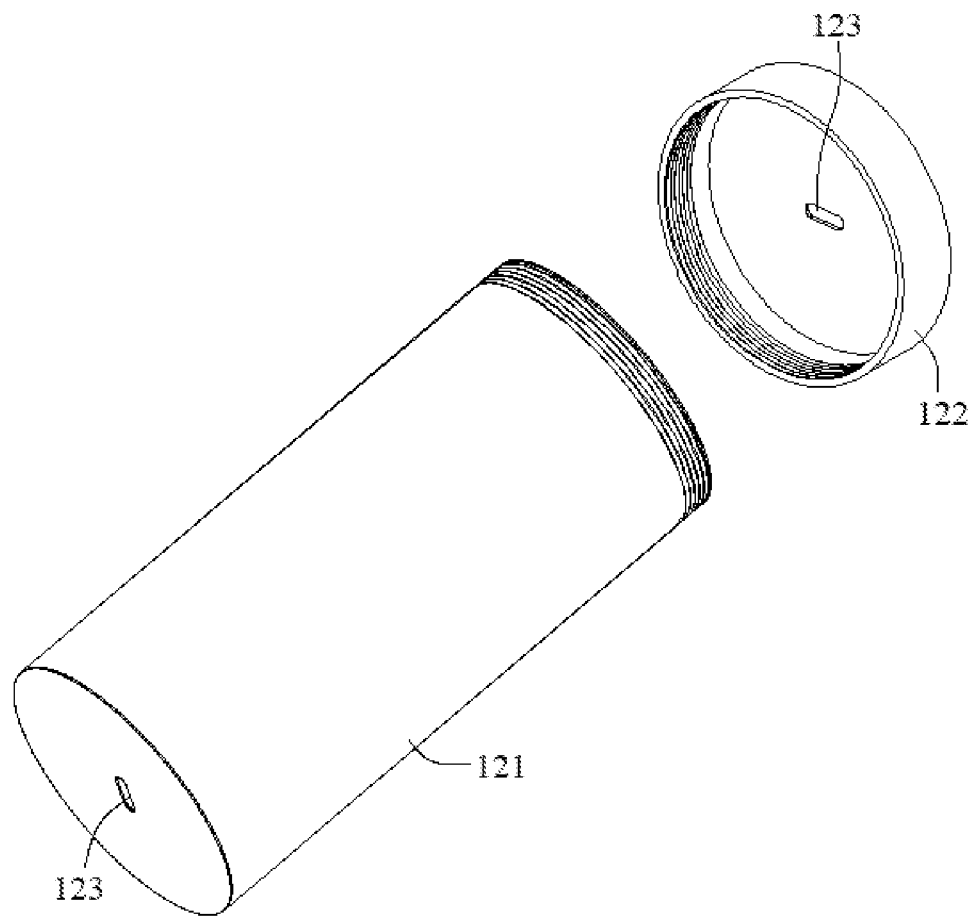
FIG. 8 is a structural schematic diagram of a tank body and a cover body in FIG. 6.

FIG. 1 is a structural schematic diagram of a battery pack according to an embodiment of the present disclosure; FIG. 2 is a partially enlarged view of Portion I of FIG. 1; FIG. 3 is a structural schematic diagram of a spray system in FIG. 1; FIG. 4 is a structural schematic diagram of a liquid storage device in FIG. 3; FIG. 5 is a perspective view of FIG. 4; FIG. 6 is an exploded view of FIG. 4; FIG. 7 is a structural schematic diagram of a driving device in FIG. 6 when a limiting component is in a second working state; and FIG. 8 is a structural schematic diagram of a tank body and a cover body in FIG. 6.

The present disclosure provides a battery pack as shown in FIG. 1. The battery pack includes a case (not shown) having an inner cavity, one or more battery units 2 disposed in the inner cavity of the case. In case of a plurality of battery units 2, they are arranged in a predetermined pattern and placed in the inner cavity of the case.

As shown in FIG. 2, in the battery pack, the battery unit 2 is provided with a vent 21. When the battery unit 2 is thermally out of control, a heat flow of high temperature and high pressure is generated inside the battery unit 2, and the vent 21 is used to discharge the heat flow, so as to reduce the risk of burning and explosion of the battery unit 2. Once the heat flow is discharged from the vent 21, the high-temperature heat flow may cause combustion of adjacent battery units 2. In order to reduce the risk of burning the adjacent units 2 when a certain battery unit 2 is out of control, a spray system 1 is provided in the battery pack of the present disclosure to reduce spreading of the heat flow and improve safety of the battery pack.

Specifically, as shown in FIG. 1 and FIG. 3, the spray system 1 includes a spray pipeline 11, which is disposed corresponding to the vent 21 of the battery unit 2. That is, the spray pipeline 11 passes through each battery unit 2 and located directly above the vent 21 of each battery unit 2. The spray pipeline is configured to circulate a spray liquid and to form an opening for releasing the spray liquid when the spray pipeline 11 is heated. Meanwhile, as shown in FIG. 3, the spray system 1 further includes a liquid storage device 12, which communicates with the spray pipeline 11 and is used for storing the spray liquid. The spray system 1 further includes a driving device 13 configured to drive the spray liquid in the liquid storage device 12 to flow into the spray pipeline 11.

According to the present disclosure, when the battery unit 2 is thermally out of control and the heat flow is discharged from the vent 21 of the battery unit 2, the spray pipeline 11 is heated by the heat flow and thus forms an opening at a position corresponding to the vent 21. Then the spray liquid in the spray pipeline 11 is discharged through the opening to prevent the heat flow from spreading. At the same time, after the spray liquid in the spray pipeline 11 is discharged through the opening, the spray liquid in the liquid storage device 12 can enter the spray pipeline 11 under the effect of the driving device 13, and further be discharged through the opening of the spray pipeline 11, thereby further preventing the heat flow from spreading.

In the spray system 1 provided with the liquid storage device 12 and the driving device 13, not only the spray liquid in the spray pipeline 11 but also the spray liquid stored in the liquid storage device 12 can be sprayed, which greatly improves the effect of spraying. In this way, the risk of heat flow spreading when the battery unit 2 is thermally out of control can be lowered, and the safety of the battery pack can be improved.

When the spray pipeline 11 is subjected to the heat flow and partially cracks or totally breaks at the impacted position, no matter how the spray pipeline 11 is broken, the discharge of the spray liquid can be achieved as long as the opening is formed. Further, when the spray pipeline 11 is subjected to a heat flow at a temperature of 500° C. or higher (for example, 660° C.), the spray pipeline 11 can form the opening at a heated position. When the battery unit 2 of the battery pack is thermally out of control, if the heat flow ejected from the vent 21 of the battery unit 2 is at the temperature of 500° C. or higher, the spray pipeline 11 can form the opening.

Further, in the first embodiment as shown in FIG. 3, the liquid storage device 12 has two liquid outlets 123 communicating with two ends of the spray pipeline 11. In another embodiment, the spray system 1 includes two liquid storage devices 12 each having liquid outlet 123, and the liquid outlets 123 of the two liquid storage devices 12 communicate with two ends of the spray pipeline 11, respectively.

In the present embodiment, when a certain battery unit 2 in the battery pack is thermally out of control and discharges the heat flow, an opening is formed in the spray pipeline 11 corresponding to the vent 21 of this battery unit 2 under the heat flow. When both ends of the spray pipeline 11 communicate with one or more liquid storage devices 12, a closed loop is formed by the spray pipeline 11 and the one or more liquid storage devices 12. That is, the spray liquid that enters the spray pipeline 11 from both ends of the spray pipeline 11 can be discharged through the opening, thereby further increasing a discharging flow amount of the spray liquid. In this way, the spray liquid can be quickly discharged when an opening is formed at any position of the spray pipeline 11, thereby improving the response speed.

In the embodiment as shown in FIG. 3, when the spray system 1 includes one liquid storage device 12 and the liquid storage device 12 has two liquid outlets 123, the two liquid outlets 123 are disposed at both ends of the liquid storage device 12 in an axial direction. In the meantime, as shown in FIG. 5 and FIG. 6, the driving device 13 is disposed in the inner cavity of the liquid storage device 12, and the driving device 13 includes two driving plates 131, which are disposed along the axial direction and movable towards the corresponding liquid outlet 123, respectively.

In the embodiment as shown in FIG. 5, the two driving plates 131 of the driving device 13 are disposed in the inner cavity of the liquid storage device 12, and respectively move towards the corresponding liquid outlet 123 when the liquid storage device 12 is filled with the spray liquid. For example, in FIG. 5, the left driving plate 131 moves to the left side and the right driving plate 131 moves to the right side. During the movement of the driving plates 131, the spray liquid in the liquid storage device 12 can be pushed into the spray pipeline 11 from the corresponding liquid outlet 123. In other words, the driving plate 131 applies thrust to the spray liquid in the liquid storage device 12 and the spray pipeline 11, so as to drive the spray liquid to be discharged through the spray pipeline 11, thereby achieving spraying.

Further, in order to enable the two driving plates 131 to move towards the corresponding liquid outlet 123, as shown in FIG. 5 and FIG. 6, the driving device 13 further includes an elastic component 132 and a limiting component 133. Two ends of the elastic component 132 are connected to the two driving plates 131, respectively. At the same time, the limiting component 133 has a first working state and a second working state. In the first working state, the limiting component 133 can limit a distance between the two driving plates 131 in such a manner that the elastic component 132 is in a compressed state, i.e., the limiting component 133 acts on the two driving plates 131 such that the two driving plates 131 are close to each other and thus compress the elastic component 132. In the second working state, the limiting component 133 can release restriction on the distance between the two driving plates 131, i.e., the limiting component 133 releases the restriction on the driving plates 131 and thus the elastic component 132, such that the elastic component 132 can be restored to an initial state (elongation).

In the present disclosure, the driving device 13 includes two driving plates 131, the elastic component 132 and the limiting component 133. In the initial state (i.e., the limiting component 133 is in the first working state), the elastic component 132 between the two driving plates 131 is in the compressed state, such that the driving device 13 stores the elastic potential energy. When no opening is formed in the spray pipeline 11 (the battery unit 2 is not thermally out of control yet), in the inner cavity of the liquid storage device 12, the elastic force of the elastic component 132 in the driving device 13 is equal to a sum of a hydraulic pressure of the spray liquid on the driving plates 131 and a pulling force of the limiting component 133 on the driving plates 131, so that the elastic component 132 can be maintained in the compressed state. When an opening is formed in the spray pipeline 11 and the spray liquid is discharged through the opening, the hydraulic pressure in the liquid storage device 12 is reduced such that the balance is broken. Then, under a restoring force of the elastic component 132, the restriction of the limiting component 133 (which is in the second working state) is overcame, and the elastic potential energy of the elastic component 132 is converted into a kinetic energy for the driving plates 131, so that the two driving plates 131 are driven to move towards the liquid outlets 123 to drive the spray liquid to be discharged.

Therefore, there is need to provide the spray system 1 according to the present disclosure with a monitoring device and a control device. That is, the spray system 1 does not need to be provided with a sensor. The spraying can be achieved with the relationship between the components of the spray system 1, and the response speed is fast and the structure is simple.

In the present disclosure, the limiting component 133 functions to limit the distance between the two driving plates 131. Thus, in the first embodiment, the limiting component 133 can include a glue material disposed between a peripheral wall of the driving plates 133 and an inner wall of the liquid storage device 12, so that the driving plates 133 and the liquid storage device 12 can be adhered together. At this moment, the limiting component 133 is in the first working state, as shown in FIG. 6. When the opening is formed in the spray pipeline 11, the adhesion effect generated by the glue material between the driving plates 133 and the liquid storage device 12 is removed under the effect of the elastic component 132, and the limiting component 133 is in the second working state, as shown in FIG. 7.

In an embodiment, the glue material can be glue or adhesive tape. The adhesive force of the glue material exerted on the driving plates 131 and the liquid storage device 12 can be changed by setting parameters such as an amount of glue or an area of the adhesive tape. In this way, after the opening is formed in the spray pipeline 11, the glue material will lose the effect after a predetermined period (for example, the glue material will be invalid in 5 minutes after the opening is formed in the spray pipeline 11).

In the second embodiment as shown in FIG. 5 and FIG. 6, the limiting component 133 can also be a strip structure connected between the two driving plates 131, and the limiting component 133 is provided with several breaking points 133a. When no opening is formed in the spray pipeline 11, the limiting component 133 is not broken yet at the breaking points 133a, and the limiting component 133 is in the first working state. When an opening is formed in the spray pipeline 11, the driving plates 131 has a tendency to move in an opposite direction under the effect of the elastic component 132, so that the limiting component 133 is broken at the break points 133a, and the limiting component 133 is in the second working state.

In another aspect, the elastic component 132 can be a spring, an elastic foam or the like, as long as it can be elastically deformed. Further, in the embodiment shown in FIG. 5 and FIG. 6, the elastic component 132 is preferably a constant force spring, which has a nearly constant elastic force with a change of the expansion and contraction amount. Therefore, in the driving device 13, the elastic component 132 can provide a constant elastic force rather than a gradually reduced elastic force during elongation, thereby further promoting the spray liquid to enter spray pipeline 11 from the liquid storage device 2.

As shown in FIG. 5, the driving plates 131 can be disposed in the liquid storage device 12 in such way that when the opening is formed in the spray pipeline 11, the driving plates 131 can move axially along the inner wall of the liquid storage device 12, and when no opening is formed in the spray pipeline 11 yet, the spray liquid cannot flow or flow with a low flow rate between the peripheral wall of the driving plates 131 and the inner wall of the liquid storage device 12, such that the liquid pressure of the spray liquid is affected to a small extent. That is, when no opening is formed in the spray pipeline 11 yet, there is no spray liquid or only a small amount of spray liquid is present between the two driving plates 131.

In a specific embodiment, a dynamic sealing structure (for example, a packing sealing or the like) can be disposed between the driving plates 131 and the liquid storage device 12, so that the driving plates 131 can move with respect to the inner wall of the liquid storage device 12 and the dynamic sealing structure has the sealing effect to prevent the spray liquid from entering the space between the two driving plates 131.

In another aspect, as shown in FIG. 5, when no opening is formed in the spray pipeline 11 yet and the limiting component 133 is still in the first working state, the distances between the two driving plates 131 and the corresponding liquid outlets 123 are equal, i.e., the driving device 13 is at the middle position of the liquid storage device 12 along the axial direction. In this regard, the hydraulic pressures received by the two driving plates 131 are substantially equal, which is conducive to maintaining the balance of the driving device 13 when no opening is formed in the spray pipeline 11 and also enables the spray liquid to be discharged from the two liquid outlets 123 when the opening is formed in the spray pipeline 11.

In the above embodiment, the liquid storage device 12 has two oppositely disposed liquid outlets 123, which are connected to the spray pipeline 11 to form a closed loop. In such an embodiment, it is merely required to provide one liquid storage device 12 and one driving device 13 in order to discharge the spray liquid from the two liquid outlets 123 of the liquid storage device 12. Such configuration has advantages of a simple structure, space saving, low cost, and uneasy failure.

In this embodiment, the liquid storage device 12 may be embodied as a liquid storage tank. As shown in FIG. 8, the liquid storage device includes a tank body 121 and a cover body 122, and the tank body 121 and the cover body 122 can be connected via a threaded connection, a clamping connection or the like. The liquid storage device 12 is required to satisfy a high sealing performance and can withstand a relatively high pressure. In an embodiment, it can be made of a metal material having high pressure resistance such as iron or stainless steel, and can also be made of a plastic material such as polypropylene (PP). The liquid storage device 12, when being made of stainless steel, can be formed as an integral structure with the spray pipeline 11, or can be connected with the spray pipeline 11 by welding. When the liquid storage device 12 is made of a plastic material such as PP, the liquid storage device 12 and the spray pipeline 11 can be connected by a push-in fitting.

The spray system 1 as shown in FIG. 3 may be installed according to the following procedures: Firstly, the spray pipeline 11 is installed and then welded with the liquid storage device 12, so as to ensure a communication and a fluent flowing pathway between the spray pipeline 11 and the liquid outlets 123 of the liquid storage device 12; secondly, one end of the spray pipeline 11 is sealed with a cover or tape, and the spray liquid is filled into the liquid storage device 12 through the other end until reaching a level at a scale mark in the liquid storage device 12 (the scale mark is at such a position that the driving device 13 can be located at the middle position of the liquid storage device 12), then the driving device 13 is placed into the liquid storage device 12, and the limiting component 133 is placed in the first working state (the elastic component 132 is in the compressed state); thirdly, the cover body 122 of the liquid storage device 12 having thread is tightened with the tank body 121, and the spray liquid is further added through the spray pipeline 11 until the entire system is filled with the spray liquid; and fourthly, the other end of the spray pipeline 11 and the liquid storage device 12 are fixedly sealed by welding to complete the overall sealing.

In a second embodiment, the liquid storage device 12 is merely provided with one liquid outlet. The liquid storage device 12 includes a first end and a second end opposite to the first end. The first and second ends are disposed along an axial direction. The second end is closed, and the first end is provided with a liquid outlet 123 communicating with the spray pipeline 11. In this embodiment, the driving device 13 is disposed in the inner cavity of the liquid storage device 12, and the driving device 13 includes a driving plate 131, an elastic component 132 and a limiting component 133. Two ends of the elastic component 132 are respectively connected to the driving plate 131 and the second end. The limiting component 133 has a first working state and a second working state. In the first working state, the limiting component 133 can limit a distance between the driving plate 131 and the second end, so as to bring the elastic component 132 in the compressed state. In the second working state, the limiting component 133 can release the restriction on the driving plate 131, such that the driving plate 131 can move towards the liquid outlet 123.

In the spray system 1 according to the present embodiment, the liquid storage device 12 merely has one liquid outlet 123, and the spray liquid can be discharged only through this liquid outlet 123. In order to improve the spraying effect, both ends of the spray pipeline 11 are respectively connected to the liquid storage device 12 as described in the second embodiment, i.e., the spray system 1 includes two liquid storage devices 12 and two driving devices 13.

In another aspect, in the above embodiment, the spray liquid in the liquid storage device 12 and the spray pipeline 11 is a fluorinated liquid. The fluorinated liquid, after being sprayed from the spray pipeline 11, can chemically react with the heat flow of the battery unit 2, thereby absorbing heat and preventing heat from spreading.

In addition, the embodiments of the present disclosure further provide a spray system 1 as shown in FIG. 3. The spray system includes a spray pipeline 11 configured to circulate a spray liquid and form an opening under heating for use in discharging of the spray liquid; a liquid storage device 12 communicating with the spray pipeline 11 and configured to store the spray liquid; and a driving device 13 configured to drive the spray liquid in the liquid storage device 12 to flow into the spray pipeline 11.

The spray system 1 can be applied in the battery pack to prevent the heat flow from spreading when the battery unit 2 in the battery pack is thermally out of control, thereby extinguishing fire. The spray system 1 can also be used in other occasions where fire extinguishing is required.

The above-described embodiments are merely preferable embodiments, but not intended to provide any limitation. Within the spirit and principle of the present disclosure, any modification, equivalent substitution or improvement or replacements should be included with the scope of the present disclosure.

What is claimed is:

1. A battery pack, comprising:
a case having an inner cavity;
a battery unit disposed in the inner cavity of the case and comprising a vent; and
a spray system comprising:
  a spray pipeline configured to circulate a spray liquid and form an opening when being heated;
  a liquid storage device communicating with the spray pipeline; and
  a driving device comprising a driving component and an elastic component connected to the driving component,
wherein the driving component, under an elastic force applied by the elastic component, drives the spray liquid in the liquid storage device to flow into the spray pipeline,
wherein the opening of the spray pipeline of the spray system is formed at a position corresponding to the vent so that the spray liquid in the spray pipeline is discharged through the opening to prevent heat flow discharged from the vent from spreading.

2. The battery pack according to claim 1, wherein the liquid storage device comprises two liquid outlets, and the two liquid outlets communicate with two ends of the spray pipeline, respectively.

3. The battery pack according to claim 2, wherein the two liquid outlets are located at two ends of the liquid storage device along an axial direction of the liquid storage device, and
the driving device is disposed in an inner cavity of the liquid storage device, and the driving component comprises two driving plates disposed along the axial direction, the two driving plates being respectively connected to two ends of the elastic component and each of the two driving plates movable towards a respective one of the two liquid outlets.

4. The battery pack according to claim 3, wherein the driving device further comprises a limiting component having a first working state and a second working state, in the first working state, the limiting component acts on the two driving plates to limit a distance between the two driving plates in such a manner that the elastic component is brought to a compressed state, and
in the second working state, the limiting component does not act on the two driving plates, and the distance between the two driving plates increases under the elastic force applied by the elastic component.

5. The battery pack according to claim 4, wherein the elastic component is one or more of a hydraulic spring, a constant force spring, or an elastic foam.

6. The battery pack according to claim 4, wherein two ends of the limiting component are respectively connected to the two driving plates, and the limiting component is provided with several breaking points, at each of which the limiting component is breakable, or
the limiting component comprises a glue material, through which a peripheral wall of each of the two driving plates and an inner wall of the liquid storage device are adhered together.

7. The battery pack according to claim 4, wherein a sliding seal structure is provided between a peripheral wall of each of the two driving plates and an inner wall of the liquid storage device.

8. The battery pack according to claim 4, wherein each of the two driving plates has a same distance from its respective one of the liquid outlets when the limiting component is in the first working state.

9. The battery pack according to claim 1, wherein the liquid storage device comprises a first end and a second end oppositely disposed to the first end, the second end is closed, and the first end is provided with a liquid outlet communicating with the spray pipeline, and
the driving device is disposed in an inner cavity of the liquid storage device and comprises a driving plate that is movable towards the liquid outlet, and two ends of the elastic component are connected to the driving plate and the second end, respectively.

10. The battery pack according to claim 9, wherein the driving device further comprises a limiting component having a first working state and a second working state,
in the first working state, the limiting component acts on the driving plate to limit a distance between the driving plate and the second end in such a manner that the elastic component is brought to a compressed state, and
in the second working state, the limiting component does not act on the driving plate, and the distance between the driving plate and the second end increases under the elastic force applied by the elastic component.

11. The battery pack according to claim 1, wherein the spray liquid in the liquid storage device and the spray pipeline is a fluorinated liquid.

12. The battery pack according to claim 1, wherein two liquid outlets of the liquid storage device communicate with two ends of the spray pipeline to form a closed loop.

13. The battery pack according to claim 1, wherein the spray pipeline passes through the battery unit and is located directly above the vent of the battery unit.

* * * * *